Sept. 4, 1951

R. H. STOTENBUR

STRAIN RELIEF DEVICE

Filed Dec. 30, 1947

2,566,912

Inventor:
Ralph H. Stotenbur,
by Ernest C. Britton
His Attorney.

Patented Sept. 4, 1951 2,566,912

UNITED STATES PATENT OFFICE 2,566,912

STRAIN RELIEF DEVICE

Ralph H. Stotenbur, Pittsfield, Mass., assignor to General Electric Company, a corporation of New York Application December 30, 1947, Serial No. 794,490

1 Claim. (Cl. 173—322)

Figure 1:
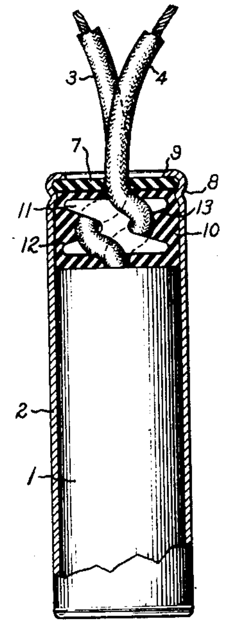

My invention relates to an improved lead lock or strain relief device whereby undue strains and pulls on electrical conductors will be effectively absorbed by my device rather than by the terminals to which the conductors may be connected.

Many variations of strain relief devices are known to the prior art but each has one or more disadvantages particularly with respect to employment in connection with relatively small or miniature electric apparatus. For example, one such prior art device comprises a small disk having a pair of spaced openings therein. The disk is disposed loosely between an electrical body within a casing and a cover therefor so that the faces of the disk are substantialy parallel to the surface of the cover which also has a pair of openings therein spaced a greater distance than the openings in the disk. A pair of terminal leads are electrically connected to the electrical body within the case and each terminal is threaded through one opening in the disk and one opening in the cover. Inasmuch as the openings in the disk and cover are offset with respect to each other, each lead is necessarily bent in passing from the disk opening to the cover opening. Therefore, when an external force or pull is exerted on either terminal the bend is increased as the otherwise loose disk is pulled toward the cover so that a wedging or binding action is set up between the lead and disk whereby the force is transmitted to or absorbed by the disk rather than by the terminal to which the lead is connected. However, the sharp bending of the wire lead is objected to since there is a tendency to thereby break one or more of the wire strands. Moreover, when employed in small electrical apparatus which are to be compound filled upon assembly the area occupied by the strain relief disk, which is disposed normal to an axis through the open or filling end of the apparatus case, is practically equal to the inside cross sectional area of the case so that the filling operation is impaired thereby. Furthermore, each terminal lead must be threaded through the fully enclosed disk opening.

It is therefore an object of my invention to provide a new and improved lead lock or strain relief device.

It is also an object of my invention to provide a strain relief device of relatively simple construction which does not employ fully enclosed apertures or openings through which the leads must be threaded.

It is a further object of my invention to provide a strain relief device which is so disposed in workable position within a compound filled electrical apparatus that a minimum space is occupied thereby and a maximum space is left for the compound filling operation.

It is still a further object of my invention to provide a lead lock in which the constraining or locking action is not dependent upon the lead being sharply bent.

In accordance with my invention I provide a relatively thin disk or plate with a notch in the edge thereof and means to prevent continued movement of the disk in a direction parallel to the faces thereof when a pull is exerted on a terminal lead which has been inserted within the notch.

Figure 2:
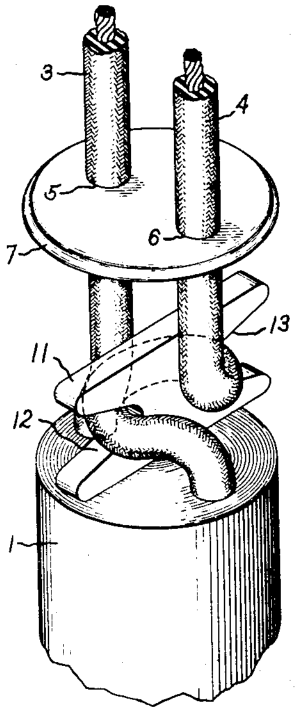

My invention will be better understood from the following description when taken in connection with the accompanying drawing and the scope of my invention will be pointed out in the appended claim. In the drawing Fig. 1 is a side elevation view partly in section of a capacitor in which my invention has been incorporated, and Fig. 2 is an enlarged perspective view of a portion of the Fig. 1 capacitor before assembly more clearly to illustrate the relationship between my invention and adjacent parts of the capacitor.

The capacitor body proper comprises alternate layers of conducting foil and dielectric material wound into a compact cylindrical roll 1 which has been inserted within a cylindrical metal case 2 through an open end thereof. Terminal leads or insulated conductors 3 and 4 are electrically connected respectively to foils of opposite polarity within the roll in a conventional manner and pass to the exterior of the case through apertures or openings 5 and 6 in the case enclosing cover plate 7. Cover plate 7 rests on a bead 8 spun in the wall of the casing adjacent the open end and is maintained in engagement therewith by a flange 9 formed by spinning the edge of the casing over so as to engage the outer surface of the cover plate. Before thus assembling the cover to the casing, however, an insulating compound or sealing wax 10 is heated and poured into the case so as to fill up all voids therein. Upon cooling the compound sets up into a somewhat stiff and relatively hard mass which effectively insulates and seals the capacitor body against the entrance of moisture from the exterior.

In accordance with the present invention, a lead lock or strain relief device 11 comprising a relatively thin plate of insulating material with a pair of V-shaped notches 12 and 13 cut in opposite edges thereof is loosely interposed during assembly between the capacitor body and the cover plate and each of the terminal leads is inserted within one of the notches. Then the sealing compound is poured into the case, and the cover plate positioned on bead 8 and flange 9 spun over into engagement with the outer surface thereof. Thereafter, when an external force is applied to a lead in a direction which would otherwise strain or break its connection to the conducting foil within the capacitor body, a wedging or binding action is set up between the lead and the notch whereby all of the force is absorbed by the lock which in turn transmits it to the solidified mass of sealing compound and thence to the cover plate and casing. Inasmuch as the lock is relatively thin with its faces substantially parallel to the axis of the terminal leads, it will be apparent that a lead is only slightly bent or offset by its passage through a notch regardless of the magnitude of the pull imposed thereon. A sealing compound is not always employed in certain types of capacitors and other electric devices in which case it should be understood that the pulling force absorbed by the lock is transmitted directly to the cover plate. Obviously, the lock would be equally as effective in those cases where both leads pass through a single aperture or opening in the cover plate. Moreover, it should also be understood that the lock would work effectively in those cases where a cover is dispensed with and only a sealing compound is employed inasmuch as the lock would be firmly embedded in the solidified mass with the notched edges presenting substantial areas of engagement therewith. In other words, all that is required is some means to prevent continued movement of the lock relative to the capacitor body upon application of a pulling force on one or both terminal leads. Plate 11 has been illustrated with V-shaped notches in the edges thereof since I have found that such a tapered notch provides a somewhat greater wedging action which automatically increases when a force is applied to a lead. However, it will be obvious that notches of other configuration would also be effective in carrying out my invention.

At this point it should be observed that the terminal leads 3 and 4 are merely inserted in the notches and it is unnecessary to thread them therethrough as would be the case if an aperture or completely enclosed hole were employed. In fact, in practicing the preferred order of assembly of the particular device illustrated whereby the leads are first threaded through the apertures in the cover before positioning the lead lock, it would thereafter be impossible to thread the leads through the notches as will be clear by inspection of Fig. 2. It should also be observed that a relatively small portion of the transverse cross section within the capacitor case is occupied by the lead lock since it is positioned therein with its faces parallel to the longitudinal axis of the case or normal to the cover plate. Thus, there is practically no interference by the lock with the compound pouring operation as is the case with some prior art locks which are disposed with their faces transversely with respect to the longitudinal axis of the case or parallel to the cover. Moreover, it should further be observed that my lock permits a helical arrangement of the terminal leads, as more clearly illustrated by Fig. 2, which further tends to eliminate sharp bends therein and results in less space being occupied thereby. This is of particular importance in those electrical devices having relatively small dimensions.

Although I have illustrated and described a lead lock having a pair of notches therein for employment in connection with a capacitor having a pair of terminal leads, I do not limit myself to this particular construction of lead lock nor its application to this particular electric device. For example, the lock may have only a single notch therein for a one lead device or it may have several or a plurality of notches therein for an electric device having many more than two leads. Moreover, it should now be apparent that its use is not limited to this particular application inasmuch as it may be employed in connection with any electrical device as long as some means is provided to limit the movement of the lock when a pull is imparted to a lead thereof.

While I have, in accordance with the patent statutes, shown and described a particular embodiment of my invention, other changes will be obvious to those skilled in the art and I, therefore, aim in the appended claim to cover all such changes as fall within the true spirit and scope of my invention.

What I claim as new and desire to secure by Letters Patent of the United States is:

In an electrical apparatus, a container having an electric device positioned therein and provided with a pair of adjacent terminal leads electrically connected to and extending from said device, a plate cover having a pair of apertures therein closing one end of said container, said apertures being substantially and respectively aligned with said leads, a lead lock comprising a relatively thin plate having a pair of oppositely disposed V-shaped notches in opposite edges thereof, said lead lock being positioned between said device and said cover and between said leads, one of said leads being helically threaded from one side of said lock through one of said notches and through the cover aperture aligned with the other lead and the other of said leads being helically threaded from the opposite side of said lock through the other of said notches and through the cover aperture aligned with said one lead.

RALPH H. STOTENBUR.

REFERENCES CITED

The following references are of record in the file of this patent:

UNITED STATES PATENTS

| Number | Name | Date |
|---|---|---|
| 877,383 | Swan | Jan. 21, 1908 |
| 1,970,269 | Benedek | Aug. 14, 1934 |
| 2,134,074 | Chirelstein | Oct. 25, 1938 |
| 2,240,394 | Eaton | Apr. 29, 1941 |

FOREIGN PATENTS

| Number | Country | Date |
|---|---|---|
| 2,074 | Netherlands | June 19, 1912 |
| 102,188 | Great Britain | Nov. 23, 1916 |